United States Patent [19]

Breitwieser et al.

[11] Patent Number: 4,941,764
[45] Date of Patent: Jul. 17, 1990

[54] ARRANGEMENT FOR FASTENING A BRAKE BOOSTER

[75] Inventors: Karl Breitwieser, Reinheim; Wolfgang Kirchner, Eschborn, both of Fed. Rep. of Germany

[73] Assignee: Alfred Teves GmbH, Frankfurt am Main, Fed. Rep. of Germany

[21] Appl. No.: 404,158

[22] Filed: Sep. 7, 1989

[30] Foreign Application Priority Data

Sep. 15, 1988 [DE] Fed. Rep. of Germany ....... 3831379

[51] Int. Cl.$^5$ .............................................. F16B 1/00
[52] U.S. Cl. ...................................... 403/24; 403/326; 403/261; 92/128
[58] Field of Search ................. 403/326, 261, 238, 24; 285/321, 205; 92/128

[56] References Cited

U.S. PATENT DOCUMENTS

| 2,248,269 | 7/1941 | Bilde | 285/321 X |
| 3,540,760 | 11/1970 | Miller | 285/321 |
| 4,725,029 | 2/1988 | Herve | 92/128 X |

Primary Examiner—Kundrat: Andrew V.
Attorney, Agent, or Firm—Robert P. Seitter

[57] ABSTRACT

A brake booster is easily fastened and free from play on the splash wall of an automotive vehicle. The guiding portion (10) of the booster housing (1) is provided with an annular groove (11) receiving a clamping ring (3) held on the splash wall (2) of the vehicle.

13 Claims, 2 Drawing Sheets

ARRANGEMENT FOR FASTENING A BRAKE BOOSTER

BACKGROUND OF THE INVENTION

This invention relates to an arrangement for fastening a brake booster to an automotive vehicle by means of a disconnectable junction without requiring tools. The housing of the booster includes a central guiding portion which passes through an opening provided in a splash wall of the automotive vehicle.

Such an arrangement is known from German Published Patent Application (DE-OS) No. 36 29 181. In the fastening arrangement disclosed therein, the brake booster housing has two shaped nuts passed through corresponding apertures formed in the splash wall of an automotive vehicle whereupon a rotary motion, or a linear displacement, will force the brake booster into a securing position wherein it detachably secured. In this arrangement, elastic means in the form of a spring plate fastened on the nuts are provided between the brake booster and the splash wall. The spring plate elastically prestress the brake booster in respect to the splash wall or a fastening bracket connected thereto. In order to have the brake booster detachably click-in in its securing position, the spring plate includes a projecting finger at the end of which a lip or nose is formed engages a notch provided in the splash wall.

These fastening arrangements have the disadvantage that the relatively complicated mounting operation which, in respect to the required rotary or displacing motion, and particularly with the means needed therefore, is carried out with difficultly in the narrow engine space. A further disadvantage is that the individual components of such a fastening arrangement have to be manufactured with high precision or that a strong spring is required in order to eliminate the play resulting in the junction. The work which must be performed in connection with forming the notches on the splash wall also is disadvantageous.

It is therefore an object of the present invention to provide an arrangement for fastening a brake booster of the type described which allows the brake booster to be fastened free from play on the splash wall of an automotive vehicle, and with the assembly therefore being significantly simplified and the cost thereof being reduced.

SUMMARY OF THE INVENTION

According to the present invention this and other objects are achieved in that the guiding portion is provided with an annular groove receiving a clamping ring held on the splash wall. The annular groove of the present invention may be formed in a clamping sleeve inseparably connected with the guiding portion, such as by way of welding, caulking or a press fitting. A further advantageous embodiment of the present invention provides that the guiding portion is provided with a conical section or that the clamping sleeve has a chamber on its side averted from the booster housing wall. These measures facilitate the introduction of the guiding portion into the clamping ring.

In a further advantageous embodiment of the fastening arrangement in accordance with the present invention, the clamping ring has at least one bevel in its area engaging the annular groove, with at least one of the side flanks of the annular groove being bevelled and cooperating with the side flank with the bevel provided on the clamping ring in the self-locking area. Accordingly an efficient tolerance compensation is provided between the two cooperating parts. Further, to provide centering of the brake booster in the splash wall, the present invention provides that the diameter of the clamping sleeve in the area where it is passed through the splash wall corresponds to the diameter of the opening provided in the splash wall.

BRIEF DESCRIPTION OF THE DRAWING

The present invention will now be explained in greater detail in the following detailed description, reference being made to two examples of embodiments illustrated in the accompanying drawing, wherein.

DETAILED DESCRIPTION

Figure 3:
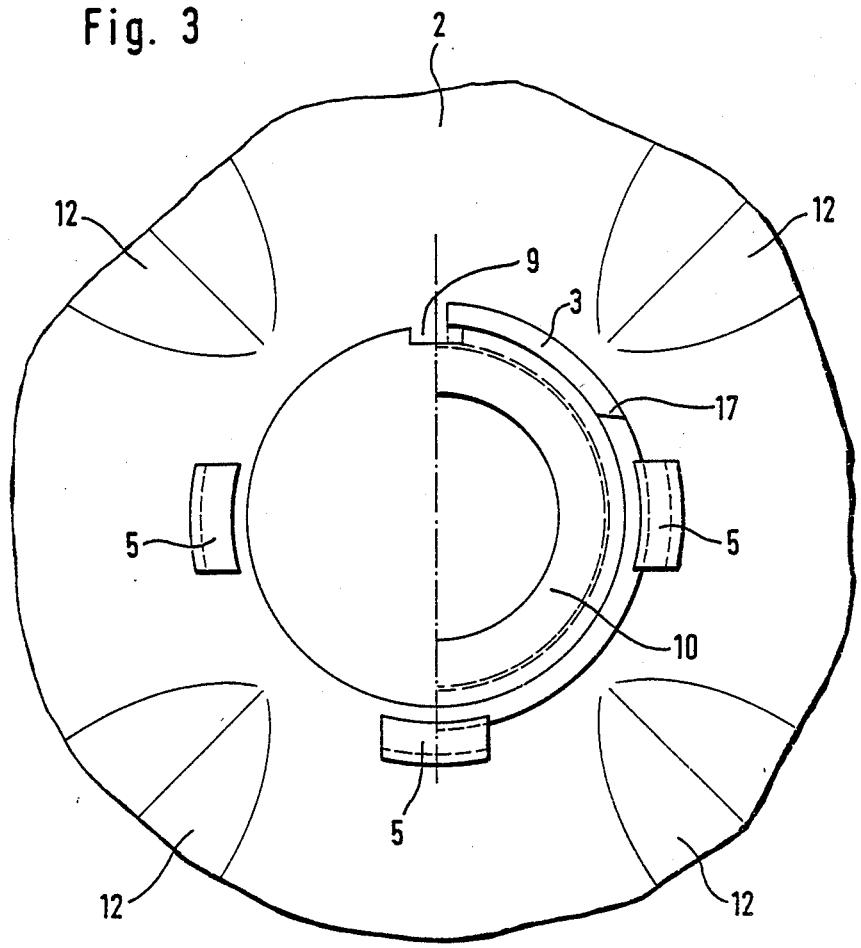

The brake booster schematically represented in the drawing includes a booster housing 1 with a central guiding portion 10 introducible into an opening of a splash wall 2 of an automotive vehicle. The guiding portion 10 is provided with a conical section 16 and has an annular groove 11 near the booster housing wall. The annular groove 11 is limited by two side flanks 14, 15 and receives a clamping ring 3. The clamping ring 3 is held on the splash wall 2 by means of several holding brackets 5 and is provided with a slot 17 (FIG. 3). The annular groove 11 of this embodiment preferably is arranged in which at least one (15) of the side flanks 14, 15 is not perpendicular, but rather runs at a certain angle to the longitudinal axis of the guiding portion 10. The side flank 15 cooperates with a bevel 7 formed on the clamping ring 3. On the one hand, this arrangement serves to compensate the tolerances existent in the components. On the other hand, because of the angle lying in the self-locking area, it takes up the operating forces in the axial direction. Further, the guiding portion 10 is provided with an axial groove 8 which, upon assembly, receives a bracket 9 formed on the splash wall 2 and in this manner secures the mounted brake booster in its mounted position against twisting.

Figure 2:
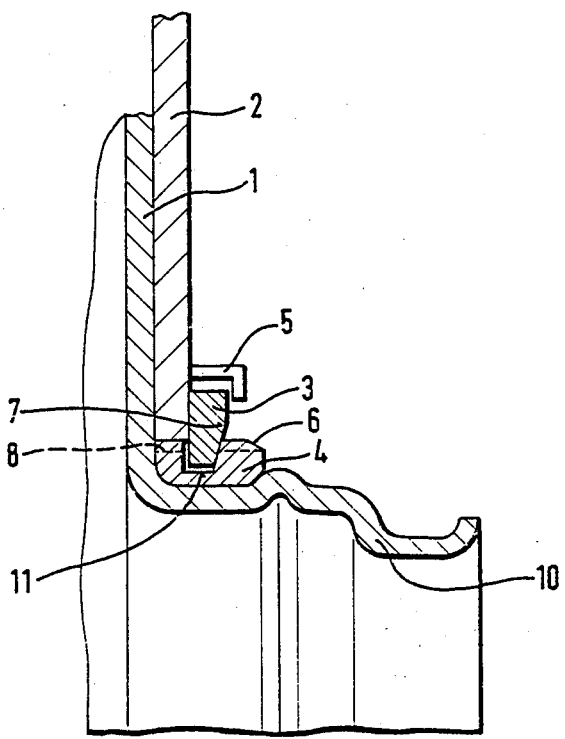
FIG. 2 is a second embodiment of the fastening arrangement in assembled condition in accordance with the present invention; and, FIG. 3 shows the splash wall of a vehicle and with a fastened brake booster.

In the second embodiment shown in FIG. 2, the previously described annular groove 11 is formed in a clamping sleeve 4. The sleeve 4 is inseparably connected with the guiding portion 10, such as by way of welding, or is held by the guiding portion 10 being rolled thereover. The diameter of the clamping sleeve 4 preferably corresponds to that of the opening provided in the splash wall 2, the clamping sleeve 4 having a chamfer 6 on its end averted from the booster housing wall. The chamfer serves to expand the clamping ring 3 upon assembly.

Figure 1:
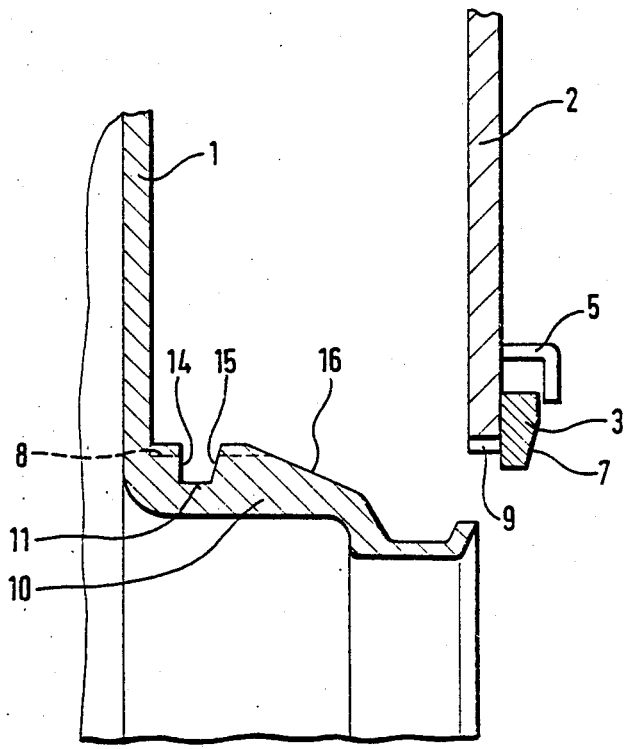
FIG. 1 is a first embodiment of the fastening arrangement of the present invention before assembly.

When mounting the brake booster on the splash wall 2 of the automotive vehicle, at first the booster housing 1 is positioned so that its guiding portion 10 faces the clamping ring 3 arranged between the holding brackets 5. Upon a subsequent movement in the direction of the booster axis the guiding portion 10 is introduced into the opening provided in the splash wall 2 so that, upon a further displacement of the booster housing 10 towards the splash wall, the clamping ring 3 is expanded due to the action of the conical section 16 (FIG. 1) or of the chamfer 6 of the clamping sleeve 4 (FIG. 2). This then enables the guiding portion 10 to be passed therethrough. In the final phase of assembly, the annular groove 11 in the guiding portion 10 or in the clamping sleeve 4 will appear radially directly opposite the expanded clamping ring 3 which, due to its prestressing force, engages the annular groove 11, with the bevel 7 formed on the clamping ring 3 forming an automatic lock together with the annular groove's 11 side flank 15 running at a slant. Accordingly all of the tolerances will be compensated which thereby provides the fastening arrangement in accordance with the present invention. The splash wall 2 is provided with reinforcing depressions 12 in the area of the opening (FIG. 3) so as to take up the forces of assembly without deformation.

What is claimed is:

1. An arrangement for fastening a brake booster to an automotive vehicle having a splash wall by means of a disconnectable junction, the booster housing of said brake booster having a central guiding portion which passes through an opening provided in a splash wall of the automotive vehicle, wherein the guiding portion (10) is provided with an annular groove (11) receiving a clamping ring (3) held on the splash wall (2).

2. An arrangement as claimed in claim 1, wherein the annular groove (11) is formed in a clamping sleeve (4) inseparably connected with the guiding portion (10).

3. An arrangement as claimed in claim 1, wherein the guiding portion (10) has a conical section (16).

4. An arrangement as claimed in claim 1, wherein the clamping ring (3) has a slot (17) and is held by means of several holding brackets (5) provided on the splash wall (2) along the circumference of an opening thereof.

5. An arrangement as claimed in claim 4, wherein the clamping ring (3) is provided with at least one bevel (7) in a self locking area engaging the annular groove (11).

6. An arrangement as claimed in claim 5, wherein at least one (15) of the side flanks (14, 15) of the annular groove (11) is bevelled and wherein its cooperation with the bevel (7) provided on the clamping ring (3) takes place in the self-locking area.

7. An arrangement as claimed in claim 2, wherein the clamping sleeve (4) has a chamfer (6) on its side averted from the booster housing wall.

8. An arrangement as claimed in claim 2, wherein the clamping sleeve (4), has an axial groove (8) receiving a bracket (9) formed on the splash wall (2).

9. An arrangement as claimed in claim 2, wherein the diameter of the clamping sleeve (4) in the area where it extends through the splash wall (2) corresponds to the diameter of the opening provided in the splash wall (2).

10. An arrangement as claimed in claim 2, wherein the clamping sleeve (4) is fastened on the guiding portion (10) by means of welding.

11. An arrangement as claimed in claim 2, wherein the clamping sleeve (4) is fastened on the guiding portion (10) by means of caulking.

12. An arrangement as claimed in claim 2, wherein the clamping sleeve (4) is fastened on the guiding portion (11) by means of a press fit.

13. An arrangement as claimed in claim 12, wherein the splash wall is provided with reinforcing depressions (12).

* * * * *